US011966517B2

(12) United States Patent
Terrell (10) Patent No.: US 11,966,517 B2
(45) Date of Patent: Apr. 23, 2024

(54) GRAPHICAL MENU STRUCTURE

(71) Applicant: Richard Terrell, Austin, TX (US)

(72) Inventor: Richard Terrell, Austin, TX (US)

(*) Notice: Subject to any disclaimer, the term of this patent is extended or adjusted under 35 U.S.C. 154(b) by 0 days.

(21) Appl. No.: 17/874,172

(22) Filed: Jul. 26, 2022

(65) Prior Publication Data

US 2023/0050286 A1 Feb. 16, 2023

Related U.S. Application Data

(60) Provisional application No. 63/232,471, filed on Aug. 12, 2021.

(51) Int. Cl.
*G06F 3/0482* (2013.01)
*G06F 3/01* (2006.01)
*G06F 3/03* (2006.01)

(52) U.S. Cl.
CPC ............ *G06F 3/017* (2013.01); *G06F 3/0304* (2013.01); *G06F 3/0482* (2013.01)

(58) Field of Classification Search
CPC ............... G06F 3/0482; G06F 3/04842; G06F 3/04817; G06F 16/58; G06F 16/434; G06F 3/0236; G06F 3/0237; G06F 21/36; G06F 3/017; G06F 3/0304; G06F 3/011
See application file for complete search history.

(56) References Cited

U.S. PATENT DOCUMENTS

| | | | |
|---|---|---|---|
| 5,784,583 A | 7/1998 | Redpath | |
| 5,798,760 A | 8/1998 | Vayda et al. | |
| 9,762,851 B1* | 9/2017 | Baumert | G06T 19/006 |
| 2005/0054381 A1 | 3/2005 | Jogn-Goo et al. | |
| 2006/0085759 A1 | 4/2006 | Knaphelde | |
| 2008/0282194 A1 | 11/2008 | Chi-Pang et al. | |
| 2015/0146925 A1* | 5/2015 | Son | G06V 20/00 382/103 |
| 2016/0125635 A1* | 5/2016 | Nam | G06F 3/0481 715/764 |
| 2016/0139769 A1 | 5/2016 | Prazak et al. | |
| 2018/0114332 A1 | 4/2018 | Desai et al. | |
| 2021/0132776 A1* | 5/2021 | Bardeli | G06F 3/04883 |

* cited by examiner

*Primary Examiner* — Phuong H Nguyen (74) *Attorney, Agent, or Firm* — A, T, & P PC; Pete Tormey (57) ABSTRACT

A human interface including steps of presenting an image, then receiving a gesture from the user. The image is analyzed to identify the elements of the image and then compared to known images and then either soliciting an input from the user or displaying a menu to the user. Comparing the image and/or graphical image elements may be effectuated using a trained artificial intelligence engine or, in some embodiments, with a structured data source, said data source including predetermined images and menu options. If the input from the user is known, then presenting a predetermined menu. If the image is not known, then presenting an image or other menu options, and soliciting from the user the desired options. Once the user selections an option, the resulting selection may be used to further train the AI system or added to the structured data source for future reference.

17 Claims, 4 Drawing Sheets

GRAPHICAL MENU STRUCTURE

PRIORITY

This application claims priority to provisional patent application 63/232,471 filed Aug. 12, 2021, by the same inventor which is included by reference as if fully set forth herein.

BACKGROUND

There is an entire industry struggling with the difficulties of human interfacing to computers or processing devices. This is the natural result of trying to get humans to interface with machines in a seamless manner. Moreover, machines tend to run in a linear programmatical fashion, whereas humans might not always behave so linearly. Human interface devices (HIDs) started with simple switches, grew to keypads, joysticks, voice interactions, touch screens, and eventually virtual reality. All of these were attempts to simplify the human-machine interactivity through intuitive interactions. To date no ideal human interface system has been developed. The main reason is because existing methods of interaction were designed as simple bridges to let complex users interact with complex machines. The narrow bandwidth of information and intent transferred by these bridges creates huge learning curves. The old design paradigm prioritizes complex software as an environment where users enter and bring in content. A new paradigm is needed that prioritizes the user and content as the goal.

SUMMARY

Disclosed herein is a system and method for a human interface including steps of presenting, to a user, an image, then receiving a gesture from the user, said gesture associated with at least a portion of the image. The image is analyzed to identify the elements of the image and then compared to known images and then either soliciting an input from the user or displaying a menu to the user. In certain embodiments the presenting is effectuated with a touchscreen, hologram, virtual reality, augmented reality headset, and the like. Accordingly, the gesture may be received from a touchscreen, motion tracking system or other human interface device.

Comparing the image and/or graphical image elements may be effectuated using a trained artificial intelligence engine, a trained neural network model or, in some embodiments, with a structured data source, said data source including predetermined historical images and menus. If the input from the user is known, then presenting a predetermined menu wherein the new menu is selected based on historical usage factors associated with the image. The historical usage factors may be embodied in a neural network or other artificial intelligence structure, or in the structured data source.

If the image is not known, then presenting an image or other menu options, and soliciting from the user the desired options. Once the user selections an option, the resulting selection may be used to further train the AI system or added to the structured data source for future reference.

Presenting a dynamic, self-adjusting menu system to a user provides for increased flexibility to put the right information in the right place at the right time to serve the user best.

DESCRIPTION

Generality of Invention

This application should be read in the most general possible form. This includes, without limitation, the following:

References to specific techniques include alternative and more general techniques, especially when discussing aspects of the invention, or how the invention might be made or used.

References to "preferred" techniques generally mean that the inventor contemplates using those techniques, and thinks they are best for the intended application. This does not exclude other techniques for the invention, and does not mean that those techniques are necessarily essential or would be preferred in all circumstances.

References to contemplated causes and effects for some implementations do not preclude other causes or effects that might occur in other implementations.

References to reasons for using particular techniques do not preclude other reasons or techniques, even if completely contrary, where circumstances would indicate that the stated reasons or techniques are not as applicable.

Furthermore, the invention is in no way limited to the specifics of any particular embodiments and examples disclosed herein. Many other variations are possible which remain within the content, scope and spirit of the invention, and these variations would become clear to those skilled in the art after perusal of this application.

Lexicography

The terms "effect", "with the effect of" (and similar terms and phrases) generally indicate any consequence, whether assured, probable, or merely possible, of a stated arrangement, cause, method, or technique, without any implication that an effect or a connection between cause and effect are intentional or purposive.

The term "relatively" (and similar terms and phrases) generally indicates any relationship in which a comparison is possible, including without limitation "relatively less", "relatively more", and the like. In the context of the invention, where a measure or value is indicated to have a relationship "relatively", that relationship need not be precise, need not be well-defined, need not be by comparison with any particular or specific other measure or value. For example and without limitation, in cases in which a measure or value is "relatively increased" or "relatively more", that comparison need not be with respect to any known measure or value, but might be with respect to a measure or value held by that measurement or value at another place or time.

The term "substantially" (and similar terms and phrases) generally indicates any case or circumstance in which a determination, measure, value, or otherwise, is equal, equivalent, nearly equal, nearly equivalent, or approximately, what the measure or value is recited. The terms "substantially all" and "substantially none" (and similar terms and phrases) generally indicate any case or circumstance in which all but a relatively minor amount or number (for "substantially all") or none but a relatively minor amount or number (for "substantially none") have the stated property. The terms "substantial effect" (and similar terms and phrases) generally indicate any case or circumstance in which an effect might be detected or determined.

The terms "this application", "this description" (and similar terms and phrases) generally indicate any material shown or suggested by any portions of this application, individually or collectively, and include all reasonable conclusions that might be drawn by those skilled in the art when this application is reviewed, even if those conclusions would not have been apparent at the time this application is originally filed.

The term "virtual machine" or "VM" generally refers to a self-contained operating environment that behaves as if it is a separate computer even though is part of a separate computer or may be virtualized using resources form multiple computers.

DETAILED DESCRIPTION

Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

System Elements

Processing System

The methods and techniques described herein may be performed on a processor-based device. The processor-based device will generally comprise a processor attached to one or more memory devices or other tools for persisting data. These memory devices will be operable to provide machine-readable instructions to the processors and to store data. Certain embodiments may include data acquired from remote servers. The processor may also be coupled to various input/output (I/O) devices for receiving input from a user or another system and for providing an output to a user or another system. These I/O devices may include human interaction devices such as keyboards, touch screens, displays and terminals as well as remote connected computer systems, modems, radio transmitters and handheld personal communication devices such as cellular phones, "smart phones", digital assistants and the like.

The processing system may also include mass storage devices such as disk drives and flash memory modules as well as connections through I/O devices to servers or remote processors containing additional storage devices and peripherals.

Certain embodiments may employ multiple servers and data storage devices thus allowing for operation in a cloud or for operations drawing from multiple data sources. The inventor contemplates that the methods disclosed herein will also operate over a network such as the Internet, and may be effectuated using combinations of several processing devices, memories and I/O. Moreover, any device or system that operates to effectuate techniques according to the current disclosure may be considered a server for the purposes of this disclosure if the device or system operates to communicate all or a portion of the operations to another device.

The processing system may be a wireless device such as a smart phone, personal digital assistant (PDA), laptop, notebook and tablet computing devices operating through wireless networks. These wireless devices may include a processor, memory coupled to the processor, displays, keypads, WiFi, Bluetooth, GPS and other I/O functionality. Alternatively, the entire processing system may be self-contained on a single device.

The processing system may also include mass storage devices such as disk drives and flash memory modules as well as connections through I/O devices to servers containing additional storage devices and peripherals. Certain embodiments may employ multiple servers and data storage devices thus allowing for operation in a cloud or for operations drawing from multiple data sources. The inventor contemplates that the methods disclosed herein will operate over a network such as the Internet, and may be effectuated using combinations of several processing devices, memories and I/O.

Client Server Processing

Figure 1:
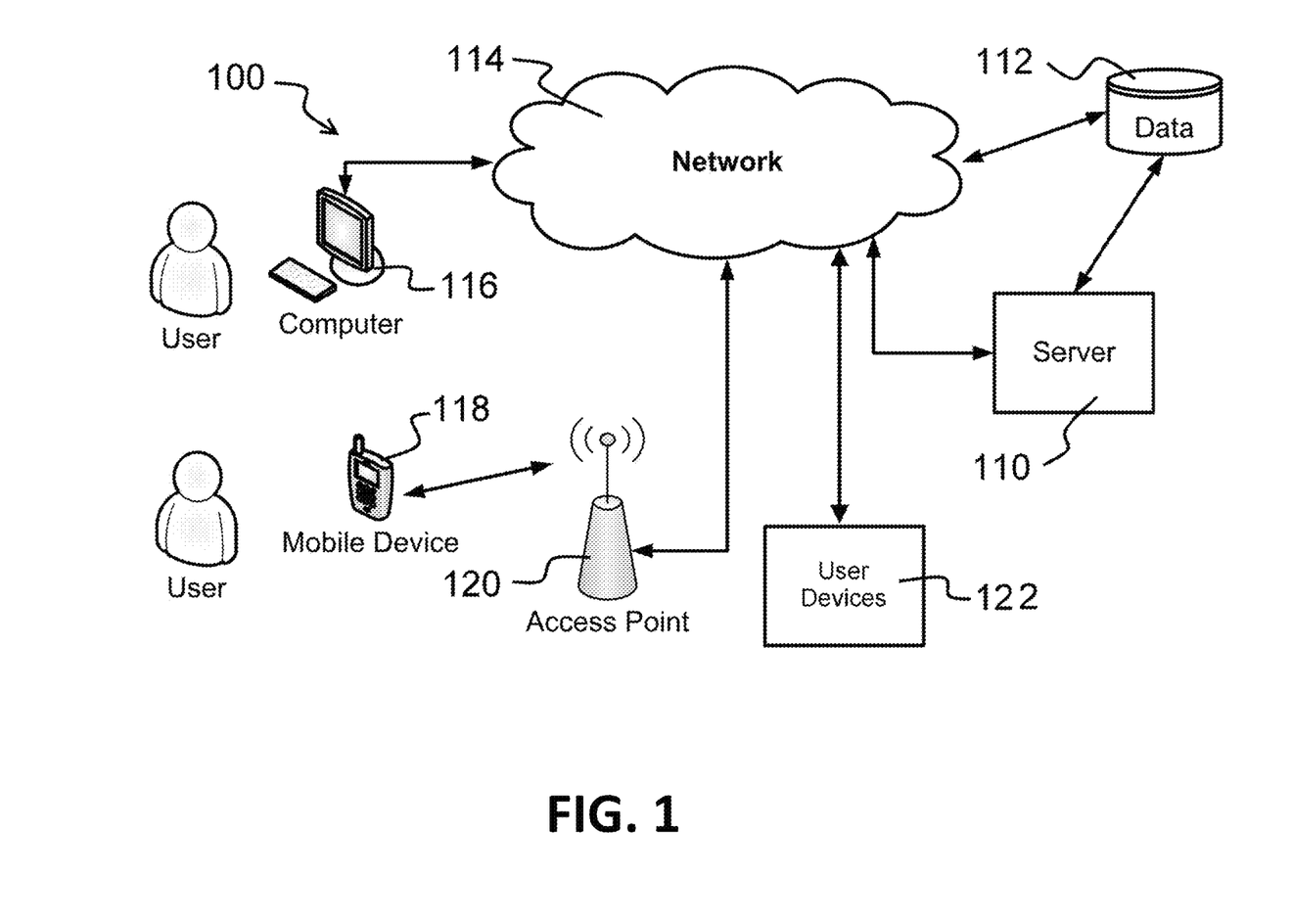
FIG. 1 shows a functional block diagram of a client server system.

FIG. 1 shows a functional block diagram of a client server system 100 that may be employed for some embodiments according to the current disclosure. In the FIG. 1 a server 110 is coupled to one or more databases 112 and to a network 114. The network may include routers, hubs and other equipment to effectuate communications between all associated devices. A user accesses the server by a computer 116 communicably coupled to the network 114. The computer 116 includes a sound capture device such as a microphone (not shown). Alternatively the user may access the server 110 through the network 114 by using a smart device such as a telephone or PDA 118. The smart device 118 may connect to the server 110 through an access point 120 coupled to the network 114. The mobile device 118 includes a sound capture device such as a microphone.

Conventionally, client server processing operates by dividing the processing between two devices such as a server and a smart device such as a cell phone or other computing device. The workload is divided between the servers and the clients according to a predetermined specification. For example in a "light client" application, the server does most of the data processing and the client does a minimal amount of processing, often merely displaying the result of processing performed on a server.

According to the current disclosure, client-server applications are structured so that the server provides machine-readable instructions to the client device and the client device executes those instructions. The interaction between the server and client indicates which instructions are transmitted and executed. In addition, the client may, at times, provide for machine readable instructions to the server, which in turn executes them. Several forms of machine readable instructions are conventionally known including applets and are written in a variety of languages including Java and JavaScript.

Client-server applications also provide for software as a service (SaaS) applications where the server provides software to the client on an as needed basis.

In addition to the transmission of instructions, client-server applications also include transmission of data between the client and server. Often this entails data stored on the client to be transmitted to the server for processing. The resulting data is then transmitted back to the client for display or further processing.

One having skill in the art will recognize that client devices may be communicably coupled to a variety of other devices and systems such that the client receives data directly and operates on that data before transmitting it to other devices or servers. Thus data to the client device may come from input data from a user, from a memory on the device, from an external memory device coupled to the device, from a radio receiver coupled to the device or from a transducer coupled to the device. The radio may be part of a wireless communications system such as a "WiFi" or Bluetooth receiver. Transducers may be any of a number of devices or instruments such as thermometers, pedometers, health measuring devices and the like.

A client-server system may rely on "engines" which include processor-readable instructions (or code) to effectuate different elements of a design. Each engine may be responsible for differing operations and may reside in whole or in part on a client, server or other device. As disclosed herein a display engine for user interoperability, a data engine for data storage and processing, an execution engine for method processing, and a user interface (UI) engine, and the like may be employed. These engines may seek and gather information about events from remote data sources and provide information to and collect information from users.

Several tools may be employed to effectuate portions of the methods described herein. For example, and without limitation, vectors-based graphics may be employed to preserve fidelity, quality, and resolution at various scaling levels.

Some embodiments may be implemented using a 3D spatial hash where x, y, and z (zoom) are used to index a given menu structure and its contents. This increases efficiency and reduces resource requirements necessary to store a large number of elements in the map.

Machine learning tools are adept at image recognition. Conventional artificial intelligence (AI) tools are readily available and, through training, acquire more accuracy over extended use. The task of image recognition often involves the creation of a neural network that process the individual pixels of a digital image. These networks are fed with many pre-labeled images to "teach" them how to recognize similar images. When an unknown image is supplied to the AI engine, it uses the trained data to identify the unknown picture.

In some embodiments the system may track user's prior experiences. For example, tracking may be used to follow a user's path through a menu structure, then in future interactions advance the menuing to a probable final result.

Once a large volume of user interactions is obtained and tracked, estimates may be made of probable reactions of users when faced with a particular menu or state of interaction. For example, and without limitation, similar pathways through menus may be recorded from differing users. An estimator or AI engine may then apply that menu known pathway to a new user in response to the new user's interaction, thus anticipating which menu items a new users may desire by using knowledge of previous user's selections.

Information may be organized according to Gestalt Principles (or Gestalt Psychology) which explain and describe how people naturally organize, understand, and perceive visual objects. Certain laws or guidelines may be used for determining which menus to advance or retard during user interactions. These include, but are not limited to:

Law of Proximity
    The system may group similar content next to each other spatially leaving empty/negative space between groups so the eye can distinguish groups easily.

Law of Closure
    The system may use the visual arrangement of content and containers for this content as a reinforcing way to illustrate additional steps to follow. The brain tends to see the whole picture, so using partial pictures will convey that there's still more content to consider.

Law of Similarity
    Similar elements (whether by function, style, usage, etc.) can be denoted with similar looks by manipulating shape, color, and size.

Law of Common Region
    Enclosing content in a shape, region, or "container" strongly indicates that they are a group. The nested menus primarily use containers to denote hierarchical grouping of content.

Law of Continuity
    A softer way to communicate that content is related. The system may arrange content in a straight or slightly curvy line. Compared to more scattered content, the ordered content will seem more related.

Law of Figure and Ground
    People instinctively know which shapes, elements, or content is in the foreground versus the background. Foreground elements are thought to be more important than background elements. In some embodiments the system may arrange content accordingly.

Law of Symmetry
    The system may arrange content symmetrically to convey a sense of completeness and order.

Law of Common Fate
    The system may suggest that elements share a common fate by causing them to move in the same direction.

Historical analysis may be employed by certain embodiments using tracking technology. This tracking may be based on Neurobiology and Ophthalmology research and include guidelines such as:

Mental Focus follows visual focus
    The system may create a more effective flow between content elements based on spatial arrangements. By manipulating the spacing of content elements, negative space can be created so that the user is less distracted by nearby content elements.

Vergence focal eye movement
  Tunnel Vision
    The system may arrange elements that are relevant closer to each other so that unimportant pieces of information are outside of view when the user's focus state begins to tunnel.
    The system may also arrange content closer to the "screen" or closer in the user's point of view. Elements that are closer to the screen may consist of higher-priority content while elements that appear to be in the distance may consist of less important content.

Panoramic Vision
    The system may arrange content in a panoramic (wide-ranging) view to aid in defocusing a user's attention. Similarly, the system may use a narrow focus to increase the user's stress and focus.

By designing around focused thinking and diffuse thinking, the system may arrange content in a way that encourages and discourages the user from making connections between content elements. By changing the spacing of grouped elements to be scattered and spaced apart, the system may influence the user to use different types of thinking.

Some embodiments may be implemented using weighting of certain factors to algorithmically determine menu presentations to a user. For example, and without limitation, historical factors for the user may be given more weight than historical factors from other users. This may allow for setting different priorities for data presentation and for providing more accurate estimates of a user's path through a menu structure.

Figure 2:
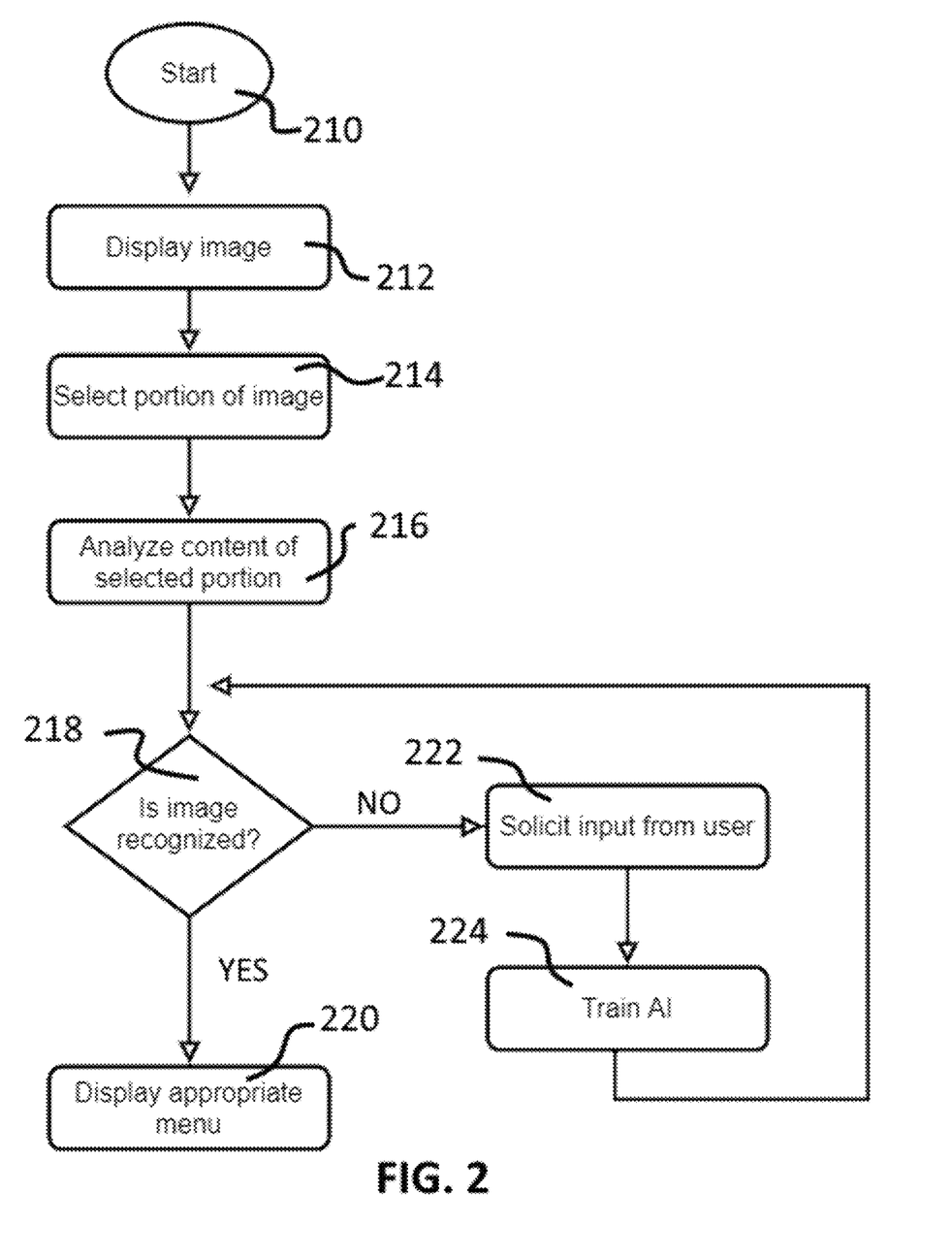
FIG. 2 represents some steps that may be employed in certain embodiments according to the present disclosure.

FIG. 2 represents some steps that may be employed in certain embodiments according to the present disclosure. The method begins at a flow label 210.

At a step 212 an image is displayed to a user. The image may be displayed on any user interface device and may contain any type of media or representation thereof. For example, and without limitation, a video or audio file may be used and the display may be holographic or on a virtual or augmented reality headset.

At a step 214 the user selects a portion of the image. The selection may be using a mouse or other human interface device such that the user indicates either a portion of the image or the entire image that was displayed in the prior step. The human interface device may capture user gestures such as hand tracking movement For example, and without limitation, a user may use a touch device to draw a shape such as a circle around an area, use a pointer device to draw the shape, or click/tap and hold so that a selection shape emerges from the target point and grows steadily until the user releases. In yet other embodiments the user may be interfacing with a virtual or augmented reality display system wherein the user's gestures indicate selection information.

Add a step 216 a processing device analyzes the content of the selected portion of the image. The objective of the analysis is to determine what the image is or what the portion of the image is using one of several processing techniques designed to identify image representations. For example, and without limitation, an artificial intelligence engine may be employed to identify what the image is. The system may use machine learning to analyze the contents within the selected area to determine which menu options and buttons to display further in the process. In some embodiments a combination of image-based analysis and cross referencing the active programs or windows on the user device to determine a digital context.

At a step 218 the processing device decides whether the image is recognized as an image that's already been identified. This determination may be through the use of AI or by comparing the image to known images in a database or other structured data store. If the answer is yes, the method proceeds to a step 220.

At a step 220 an appropriate menu is displayed to the user. The menu is in response to the user's selection and the image analysis. The menu may include text, images or other indicia to indication selection options. In some embodiments, the indicia may include purely informational representations.

If the image in step 218 is not recognized the method proceeds to a step 222. At step 222 input from the user is solicited to help identify the image or the portion of the image that the user selected. This may include soliciting information about the image, or, in certain embodiments, the AI engine may determine what the elements of the image include and then ask the user questions about the elements of those image. For example, and without limitation, a user may select an image of a truck, then the AI engine may identify the tires as being round and ask the user if this a vehicle? After receiving input from the user flow proceeds to a step 224.

At a step 224 the input from the user, together with the images, is used to train the AI engine. The process may iterate by returning to the step 218, verifying that the image is now recognizable and if it is, then proceeding to the step 220. If the image is not recognized, then proceeding to the step 222 until sufficient information is garnered that the AI can be appropriately trained.

At the step 220 a dynamically created menu is displayed to the user. The menu may include text, images, buttons or other input options that may be displayed on the edge of the selected area. Which input options are displayed is determined by the analysis results and, in some embodiments, a number of additional factors. These factors may include:

Content precedence (What kind of functions are commonly used with the items within the selected area.)
User's current learning state
Nearby UI indicia and their content and button configuration
Selected workflow.

The visual appearance (including but not limited to size and arrangement of buttons on the menu) may be determined by factors such as:

User history
Most used functions
Most important functions
Nearby UI indicia and their content and button configuration
The depth of buttons and other elements within the button for nested indicia
Word cloud analysis.

Once the UI menu indicia is established the user may select any of the buttons located on the indicia. Interacting with a button may yield different results depending on which button is selected and how the selection is made:

The content within a ring container is modified
The button can change
The button be removed
The button can change an aspect of another ring container The user may zoom-in on the UI menu elements (buttons). The entire ring UI including its buttons will expand when you zoom in. The content may stay fixed or expand as well depending on the content, context, or user preference. Any content container may have additional content within it allowing a user to zoom-in to reveal more information. For example, and without limitation, a menu selection item may link to other menu selection items, in-turn, linked to yet other selection items, having the effect of moving down into more relevant content as the user makes selections.

The dynamic map elements may exist in a virtual space and an associated, real-world context. For example, and without limitation, the screen "screen content" may be presented anywhere such as over a kitchen sink. Interfacing doesn't require a conventional computer screen. The interface may be anywhere the user is and interfaced remotely.

References in the specification to "one embodiment", "an embodiment", "an example embodiment", etc., indicate that the embodiment described may include a particular feature, structure or characteristic, but every embodiment may not necessarily include the particular feature, structure or characteristic. Moreover, such phrases are not necessarily referring to the same embodiment. Further, when a particular feature, structure or characteristic is described in connection with an embodiment, it is submitted that it is within the knowledge of one of ordinary skill in the art to effect such feature, structure or characteristic in connection with other embodiments whether or not explicitly described. Parts of the description are presented using terminology commonly employed by those of ordinary skill in the art to convey the substance of their work to others of ordinary skill in the art.

Figure 3:
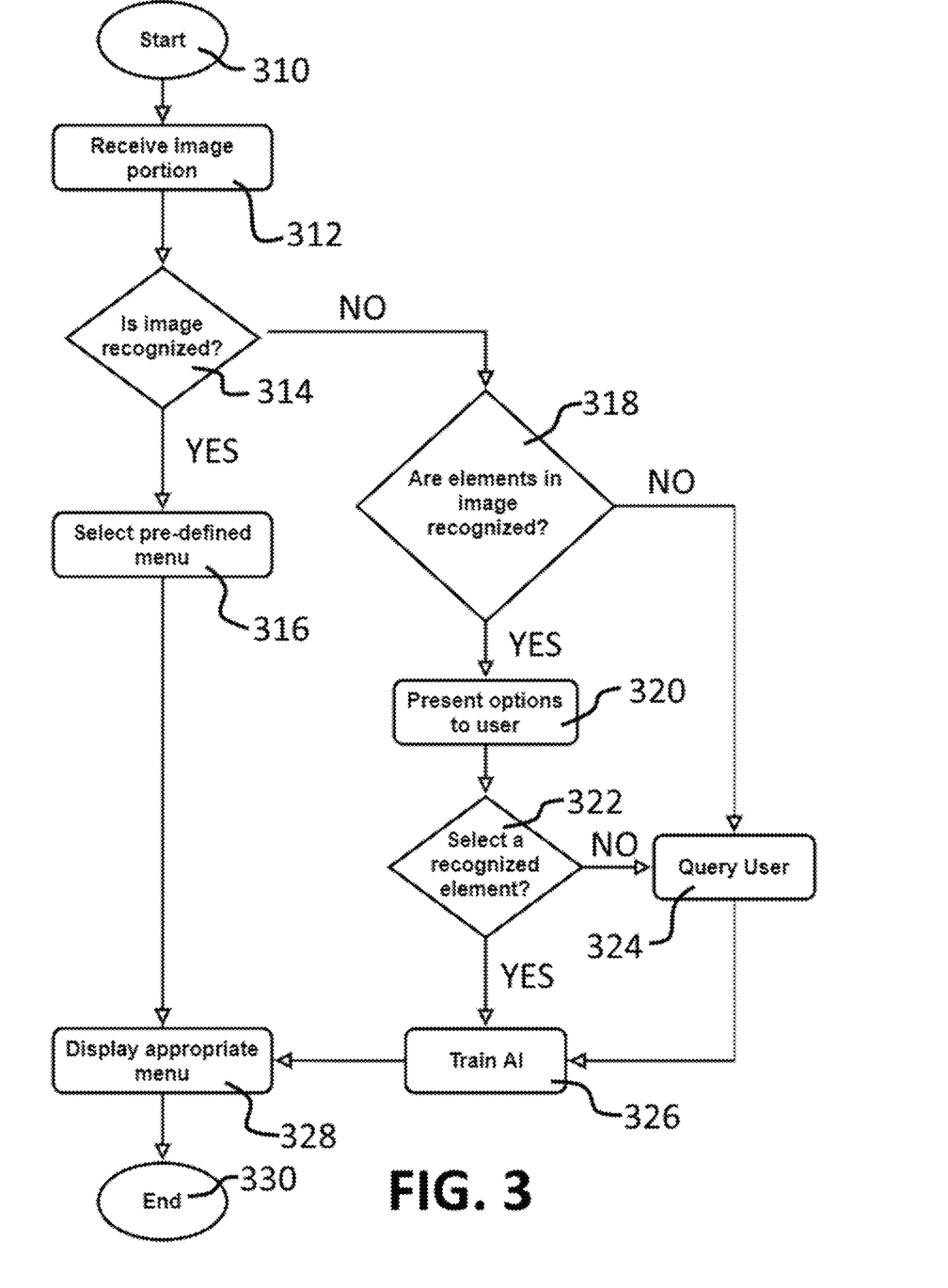
FIG. 3 represents some steps that may be employed in certain embodiments according to the present disclosure.

FIG. 3 represents process steps that may be employed in certain embodiments according to the present disclosure. The method begins at a flow label 310.

At a step 312 a processing device, such as a server, receives the image information, or a portion of the image. Then the method proceeds to a step 314.

At the step 314 the image is fed to an AI engine or other image identification engine, to determine if the image is recognized. If the image is recognized, flow proceeds to a step 316. If not flow proceeds to a step 318.

At the step 318 the graphical elements in the image are analyzed to see if the elements that make up the image are identifiable. If yes, the flow proceeds to a step 320.

At the step 320 options are presented to the user to query them about the elements of the image and the flow then proceeds to a step 322.

At the step 322 the results from the user input are analyzed to see if they had selected a recognizable element. If yes flow proceeds to a step 326. If no flow proceeds to a step 324.

At the step 324 a user was queried about the elements of the image or portions of the image. The results of this query are fed to an AI engine in the step 326.

At the step 326 the image analysis engine or AI engine is trained in response to the recognized elements from step 322, or from the query of the user at the step 324 among other criteria. In certain embodiments if the AI cannot be properly trained, flow would return to the step 314 in the process would be iterated until sufficient information about the image or the elements of the image to train the image recognition engine are known. The flow then proceeds to a step 328.

At the step 328 the appropriate menu is displayed. As described herein, this menu is based at least in part on the recognized image.

At a flow label 330 the method ends.

Figure 4:
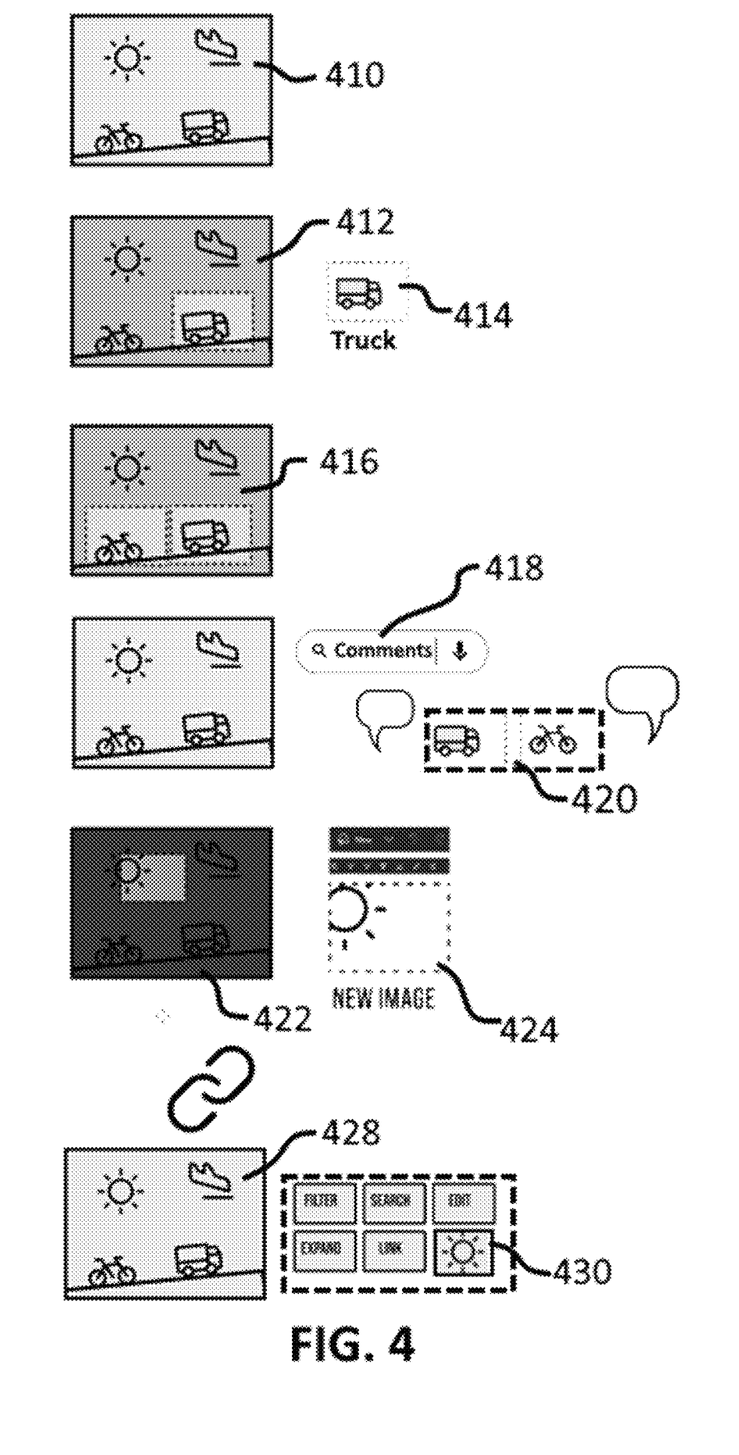
FIG. 4 shows a graphical representation of some capabilities of the processes described herein.

FIG. 4 shows a graphical representation of some capabilities of the processes described herein.

Image 410 shows a representation of four unique objects that may be displayed to a user; a sun, an airplane, a bicycle, and a truck. While images are shown for clarity, any media type may be employed.

At item 412 a user has selected one of the elements of the image in 410, the truck. Item 414 is the image of the truck that would be sent to an image identification engine. In this example, the image identification engine would identify item 414 as a truck. Moreover, the image identification engine could identify other wheeled vehicles in the image. For example, and without limitation, in 416 the image identification engine identified two vehicles—the original truck and a bicycle. Note, from the perspective shown, both the bicycle and the truck are two wheeled vehicles.

Having identified the two vehicles, a menu option item 418 is presented to the user. In the example shown as 416, both the image of the truck and the image of the bicycle are used to query a database. Here, by way of example, it shows two comments from users, one regarding a truck and one regarding a bicycle. For another example, a user could say "Here is a picture of my truck." or "I used to have a similar bicycle." As shown, the user is using a portion of the image, to dynamically generate a menu, and select operations from that menu which are related to the image.

Item 422 shows a different operation. In item 422 a user selects a portion of the image. As shown in item 424 the portion of the image is a partial representation of a sun. Here, the sun would be recreated as a new image and identified as a sun and associated with the other images such as the airplane, the bicycle, and the truck, from which the image of the sun was taken. In certain embodiments the user may have to provide identifying material unless an image of the sun (or an image similar to the sun) is already in the data store and can be recognized by the image analysis engine.

Having a new image linked to a master image 422 allows the image 428 to be queried even further. In the example shown as item 430 menu items are presented that are linked to the sun image, the airplane image, the bicycle image, and the truck image. Therefore, allowing a user to build advanced image-based menus and provide operations on those menus that are responsive to the image selected provides for a multiple level graphical menuing process. Moreover, repetitive selections of image element sequences may provide known pathways through a menu structure allowing optimal selection of possible menu options.

In certain embodiments, the images themselves may form the basis for menu items as shown in item 430. This may allow for nested customizable menus using indicia such as text, graphics or other media content.

Additional Dimensions

In yet other embodiments additional dimensions may be effectuated. For example, and without limitation, in addition to the 3d Spatial hash (x,y,z) for positioning elements in a virtual space, elements may have 5 or more additional coordinates. The result is a multi-dimensional coordinate system with 8 or more dimensions. This additional set of coordinate data may include:

Real-world position: GPS-like tags or locations including latitude and longitude information (i.e., N40° 44.9064', W073° 59.0735').

Relative Position: The position can be anchored to any real-world or virtual object. For example, and without limitation, an XYZ hash and an object. The object can be defined as a 2D image or approximated as a 3D volumetric cube. The XYZ hash defines a point in space relative to the object's position. This design allows a coordinate to follow an object even if the object moves from its initial position. This movement can be calculated and updated in real-time.

View Angle Vector: At what view angle to display or activate the menu elements which may be determined via a pair of anchors. One point can act as an anchor for the "camera" and the second point will be the direction the camera faces. When put together, a viewing angle is defined. Moreover, instead of using two anchors, it is possible to use one anchor point and pair it with accelerometer, gyroscope, or magnetometer data to determine the angle.

Temporal: A time marker that includes absolute time (e.g. (9:38.44 AM 7/19/2022) and/or a relative time (e.g. Daybreak/After work), or an event relative time (i.e., doors open in 10 minutes).

Other embodiments may allow for a wide range of additional contexts including user intent, user learning state, physiological state, environment, etc.

Advantages

There is a demand for new and creative human interfaces with technology especially in the fast moving augmented and virtual reality spaces. The present disclosure provides for embodiments that may encompass a real world-virtual duality that may provide humans increased flexibility to put the right information in the right place at the right time to serve the user best.

The above illustration provides many different embodiments or embodiments for implementing different features of the invention. Specific embodiments of components and processes are described to help clarify the invention. These are, of course, merely embodiments and are not intended to limit the invention from that described in the claims.

Although the invention is illustrated and described herein as embodied in one or more specific examples, it is nevertheless not intended to be limited to the details shown, since various modifications and structural changes may be made therein without departing from the spirit of the invention and within the scope and range of equivalents of the claims. Accordingly, it is appropriate that the appended claims be construed broadly and in a manner consistent with the scope of the invention, as set forth in the following claims.

What is claimed:

1. A human interface method including:
   presenting, to a user, an image, said image presenting a menu option;
   receiving a gesture from the user, said gesture associated with at least a portion of the image;
   analyzing the portion of the image;
   selecting one or more new menu elements in response to said analyzing, whereas at least one of the new menu elements are selected based on factors selected from a group consisting of a common region, a perceived proximity, and a perceived continuity, and
   displaying an amended image in response to said selecting.

2. The method of claim 1 wherein the analyzing is effectuated with a trained neural network model.

3. The method of claim 1 where the analyzing is effectuated using a structured data source.

4. The method of claim 1 wherein the gesture is received from either a motion tracking device or a touch screen.

5. The method of claim 1 wherein the known images are associated with historical menu selections.

6. The method of claim 1 wherein said displaying is effectuated with a virtual reality, an augmented reality headset, or a hologram.

7. The method of claim 1 wherein said common region includes enclosing the menu elements in a shape, region, or container.

8. The method of claim 1 wherein said perceived proximity includes grouping similar menu elements together spatially and leaving space between different groups.

9. The method of claim 1 wherein said perceived continuity includes arranging menu elements in either a straight or a curvy line.

10. One or more processor-readable memory devices encoded with non-transitory processor instructions directing one or more processors to perform a method including:
    presenting, to a user, an image, said image presenting a menu option;
    receiving a gesture from the user, said gesture associated with at least a portion of the image;
    analyzing the portion of the image;
    selecting one or more new menu elements in response to said analyzing, whereas at least one of the new menu elements are selected based on factors selected from a group consisting of a common region, a perceived proximity, and a perceived continuity, and
    displaying an amended image in response to said selecting.

11. The devices of claim 10 wherein the analyzing is effectuated with a trained neural network model.

12. The devices of claim 10 where the analyzing is effectuated using a structured data source.

13. The devices of claim 10 wherein the gesture is received from either a motion tracking device or a touch screen.

14. The method of claim 10 wherein said presenting is effectuated with a virtual reality, an augmented reality headset, or a hologram.

15. The devices of claim 10 wherein said common region includes enclosing the menu elements in a shape, region, or container.

16. The devices of claim 10 wherein said perceived proximity includes grouping similar menu elements together spatially and leaving space between different groups.

17. The devices of claim 10 wherein said perceived continuity includes arranging menu elements in either a straight or a curvy line.

* * * * *